US011677552B2

(12) United States Patent
Pe'Er et al.

(10) Patent No.: US 11,677,552 B2
(45) Date of Patent: Jun. 13, 2023

(54) METHOD FOR PREVENTING MISUSE OF A CRYPTOGRAPHIC KEY

(71) Applicant: Coinbase IL RD Ltd., Oakland, CA (US)

(72) Inventors: Guy Pe'Er, Talmey Yechiel (IL); Nir Steinherz, Modiin-Maccabim-Reut (IL)

(73) Assignee: Coinbase IL RD Ltd., Oakland, CA (US)

( * ) Notice: Subject to any disclaimer, the term of this patent is extended or adjusted under 35 U.S.C. 154(b) by 0 days.

(21) Appl. No.: 17/469,928

(22) Filed: Sep. 9, 2021

(65) Prior Publication Data

US 2023/0076557 A1   Mar. 9, 2023

(51) Int. Cl.
*H04L 9/08* (2006.01)
*H04L 9/32* (2006.01)

(52) U.S. Cl.
CPC .............. *H04L 9/088* (2013.01); *H04L 9/085* (2013.01); *H04L 9/3247* (2013.01); *H04L 2209/46* (2013.01)

(58) Field of Classification Search
CPC ....... H04L 9/088; H04L 9/085; H04L 9/3247; H04L 9/0891; H04L 9/14; H04L 2209/46
USPC ........................................................ 380/277
See application file for complete search history.

(56) References Cited

U.S. PATENT DOCUMENTS

| | | | | |
|---|---|---|---|---|
| 7,136,489 B1* | 11/2006 | Madhusudhana | ..... | H04L 9/3218 380/278 |
| 7,178,033 B1* | 2/2007 | Garcia | ..... | H04L 63/04 713/184 |
| 8,010,989 B2* | 8/2011 | Adams | ..... | H04W 12/084 455/410 |
| 9,300,639 B1* | 3/2016 | Roth | ..... | H04L 63/0807 |
| 9,367,697 B1* | 6/2016 | Roth | ..... | H04L 9/0897 |
| 9,397,835 B1* | 7/2016 | Campagna | ..... | H04L 9/0825 |
| 9,608,813 B1* | 3/2017 | Roth | ..... | H04L 63/0807 |
| 10,073,981 B2* | 9/2018 | Arasu | ..... | H04L 9/0819 |
| 10,211,977 B1* | 2/2019 | Roth | ..... | H04L 9/3234 |
| 11,115,196 B1* | 9/2021 | Triandopoulos | ..... | H04L 63/083 |
| 2005/0223242 A1* | 10/2005 | Nath | ..... | G06F 21/6209 713/193 |
| 2006/0120526 A1* | 6/2006 | Boucher | ..... | H04L 63/12 380/247 |
| 2008/0184225 A1* | 7/2008 | Fitzgerald | ..... | G06F 9/45558 718/1 |
| 2009/0138699 A1* | 5/2009 | Miyazaki | ..... | H04L 63/061 717/170 |
| 2009/0154705 A1* | 6/2009 | Price, III | ..... | H04L 9/0833 380/277 |
| 2010/0158254 A1* | 6/2010 | Schaad | ..... | H04L 9/0891 380/282 |

(Continued)

*Primary Examiner* — Amare F Tabor
*Assistant Examiner* — Mahabub S Ahmed
(74) *Attorney, Agent, or Firm* — Perkins Coie LLP

(57) ABSTRACT

Preventing misuse of a cryptographic key by receiving a request to carry out a cryptographic operation using a cryptographic key from a requesting entity, distributing the request to a quorum comprising multiple computerized devices, receiving a decision from the multiple computerized devices on whether or not the cryptographic operation using the cryptographic key is allowed, and carrying out the cryptographic operation using the cryptographic key according to the decision from the multiple computerized devices.

18 Claims, 4 Drawing Sheets

(56) References Cited

U.S. PATENT DOCUMENTS

| | | | |
|---|---|---|---|
| 2010/0202618 A1* | 8/2010 | Yang | H04L 9/0844 380/277 |
| 2011/0138475 A1* | 6/2011 | Gordon | H04L 9/0897 726/26 |
| 2012/0321086 A1* | 12/2012 | D'Souza | H04L 63/0428 380/278 |
| 2013/0259234 A1* | 10/2013 | Acar | H04L 9/088 380/278 |
| 2013/0291056 A1* | 10/2013 | Gaudet | H04L 63/0853 726/1 |
| 2014/0195807 A1* | 7/2014 | Bar-El | H04L 9/0877 713/168 |
| 2014/0201533 A1* | 7/2014 | Kruglick | H04L 9/0825 713/171 |
| 2015/0086020 A1* | 3/2015 | Harjula | H04L 9/083 380/279 |
| 2015/0271144 A1* | 9/2015 | Ronca | H04L 9/0891 713/168 |
| 2015/0271157 A1* | 9/2015 | Ronca | H04L 63/06 713/168 |
| 2015/0271158 A1* | 9/2015 | Ronca | H04L 63/06 713/168 |
| 2015/0382274 A1* | 12/2015 | Logvinov | H04L 47/13 370/311 |
| 2016/0253322 A1* | 9/2016 | Li | G06F 16/137 707/747 |
| 2017/0019412 A1* | 1/2017 | Castro | H04L 63/20 |
| 2017/0046664 A1* | 2/2017 | Haldenby | G06Q 10/063114 |
| 2017/0187523 A1* | 6/2017 | Andrews | H04L 9/085 |
| 2017/0317889 A1* | 11/2017 | Moon | H04L 67/10 |
| 2018/0004930 A1* | 1/2018 | Csinger | H04L 63/0853 |
| 2018/0309567 A1* | 10/2018 | Wooden | G06F 21/57 |
| 2019/0173854 A1* | 6/2019 | Beck | H04L 63/123 |
| 2019/0268165 A1* | 8/2019 | Monica | G06F 21/604 |
| 2019/0295050 A1* | 9/2019 | Chalkias | G06Q 20/3827 |
| 2019/0305938 A1* | 10/2019 | Sandberg-Maitland | H04L 9/0897 |
| 2019/0372779 A1* | 12/2019 | Monica | H04L 9/14 |
| 2019/0392439 A1* | 12/2019 | Perullo | H04L 9/0637 |
| 2020/0007313 A1* | 1/2020 | Vouk | H04L 9/3239 |
| 2020/0082388 A1* | 3/2020 | Wang | G06Q 20/3678 |
| 2020/0090188 A1* | 3/2020 | Wince | H04L 9/50 |
| 2020/0204357 A1* | 6/2020 | Seyfried | H04L 9/3215 |
| 2020/0266997 A1* | 8/2020 | Monica | H04L 9/0897 |
| 2020/0341689 A1* | 10/2020 | Smith | G06F 3/0614 |
| 2020/0344070 A1* | 10/2020 | Li | H04L 9/0825 |
| 2020/0382310 A1* | 12/2020 | Jayachandran | G06N 20/00 |
| 2020/0412755 A1* | 12/2020 | Jing | H04L 63/1416 |
| 2021/0004366 A1* | 1/2021 | Bartolucci | H04L 9/3073 |
| 2021/0051022 A1* | 2/2021 | Jarjoui | H04L 9/0631 |
| 2021/0056545 A1* | 2/2021 | McCauley | G06Q 20/3226 |
| 2021/0056547 A1* | 2/2021 | Monica | G06Q 20/3674 |
| 2021/0056548 A1* | 2/2021 | Monica | G06Q 20/3674 |
| 2021/0067345 A1* | 3/2021 | Shamai | H04L 9/14 |
| 2021/0089676 A1* | 3/2021 | Ford | H04L 9/0825 |
| 2021/0091934 A1* | 3/2021 | Fletcher | G06Q 20/389 |
| 2021/0157937 A1* | 5/2021 | Van Liesdonk | H04L 9/008 |
| 2021/0158342 A1* | 5/2021 | Bartolucci | G06Q 20/3829 |
| 2021/0303644 A1* | 9/2021 | Shear | G06F 16/93 |
| 2021/0344508 A1* | 11/2021 | Dasen | H04L 9/0894 |
| 2021/0392003 A1* | 12/2021 | Law | H04L 9/085 |
| 2021/0409405 A1* | 12/2021 | Salajegheh | H04L 63/0884 |
| 2021/0409945 A1* | 12/2021 | Gaudet | H04L 63/10 |
| 2022/0100777 A1* | 3/2022 | Jing | H04L 9/50 |

* cited by examiner

METHOD FOR PREVENTING MISUSE OF A CRYPTOGRAPHIC KEY

FIELD

The present disclosure generally relates to a method for preventing misuse of a cryptographic key.

BACKGROUND

A firewall is a tool used to monitor access to a network, and ensure that only authorized traffic is allowed. A key-misuse protection engine can serve as a cryptography firewall, monitoring usage of cryptographic keys of all types, and ensuring that only legitimate operations using the key are allowed. It is crucial that the key-misuse mechanism cannot be bypassed by directly breaching a machine that issues a request.

Existing hardware security modules (HSMs) do not effectively protect against key misuse, as they only offer basic authentication and authorization mechanisms. Clients of an HSM are commonly machines that are authorized to use certain keys. One only needs to breach or have access to such machines, in order to command the HSM and use its keys. An attacker breaching any machine that is authorized to access an HSM and request cryptographic operations can carry out those operations exactly like a legitimate application. In some important cases, it suffices to misuse a key once in order to carry out a devastating attack. For example, a single misuse of a root Certificate authority (CA) key can provide an attacker with a legitimate certificate that can be used to impersonate legitimate entities in the system, a single misuse of a code signing key can enable an attacker to distribute malware that is accepted by all as valid code, and a single misuse of a signing key for crypto-assets is all that is needed to steal all of the funds protected by that key. In addition to the above, a lot of damage can be made by an attacker fraudulently using decryption and other keys. This critical security issue is simply not dealt with by HSMs and other key stores today, beyond verifying that the client connecting is generally authorized. This is a critical flaw in existing cryptographic infrastructure.

SUMMARY

In one aspect of the invention a method is provided for preventing misuse of a cryptographic key, the method including receiving a request to carry out a cryptographic operation using a cryptographic key from a requesting entity, distributing the request to a quorum including multiple computerized devices, receiving a decision from the multiple computerized devices on whether or not the cryptographic operation using the cryptographic key is allowed, carrying out the cryptographic operation using the cryptographic key according to the decision from the multiple computerized devices.

In some cases, at least one of the multiple computerized devices is controlled by a person. In some cases, the method further includes evaluating a complexity level of the request and determining the multiple computerized devices in the quorum based on the complexity level. In some cases, the computerized devices in the quorum determine whether or not to allow the cryptographic operation using the cryptographic key based on a policy.

In some cases, the method further includes updating a policy in at least one of the computerized devices in the quorum. In some cases, the policy is identical in all the computerized devices in the quorum. In some cases, the policy is different among at least two of the computerized devices in the quorum. In some cases, the method further includes evaluating a complexity level of the request, updating the policy in at least some of the computerized devices in the quorum based on the complexity level of the request. In some cases, the multiple computerized devices perform an MPC process, wherein the decision is an output of the MPC process.

In some cases, the method further includes the multiple computerized devices performing a checking process for the requesting party, the multiple computerized devices providing multiple signatures attesting to the checking process, an entity who agrees to carry out the cryptographic operation verifying that the cryptographic operation meets the policy, the entity who agrees to carry out the cryptographic operation verifying that the signatures from the multiple computerized devices are valid.

In some cases, the method further includes the multiple computerized devices performing a checking process for the requesting party, the multiple computerized devices providing multiple signatures attesting to the checking process, two or more entities holding shares of the cryptographic key who agree to carry out the cryptographic operation verifying that the cryptographic operation meets the policy, the two or more entities verifying that the multiple signatures received from the multiple computerized devices are valid, the two or more entities performing an operating MPC process using the shares of the cryptographic key to carry out the cryptographic operation.

In some cases, the method further includes the multiple computerized devices performing a checking process for the requesting party, the multiple computerized devices running a signature MPC process to generate a single signature attesting to the checking process, an entity who agrees to carry out the cryptographic operation verifying that the cryptographic operation meets the policy, an entity who agrees to carry out the cryptographic operation verifying that single signature from the multiple computerized devices is valid.

In some cases, the method further includes the multiple computerized devices performing a checking process for the requesting party, the multiple computerized devices running a signature MPC process to generate a single signature attesting to the checking process, two or more entities holding shares of the cryptographic key who agree to carry out the cryptographic operation verifying that the cryptographic operation meets the policy, two or more entities holding shares of the cryptographic key who agree to carry out the cryptographic operation verifying that the signature from the multiple computerized devices is valid, the two or more entities performing an operating MPC process using the key shares to carry out the cryptographic operation.

In some cases, the method further includes the multiple computerized devices performing a checking process for the requesting party, the multiple computerized devices and the two or more entities holding shares of the cryptographic key, the multiple computerized devices and the two or more entities agree to carry out the cryptographic operation verifying that the cryptographic operation meets the policy, the multiple computerized devices and the two or more entities running an operating MPC process to carry out the cryptographic operation on the shares.

BRIEF DESCRIPTION OF THE DRAWINGS

The invention may be more clearly understood upon reading of the following detailed description of non-limiting exemplary embodiments thereof, with reference to the following drawings, in which.

Figure 1:
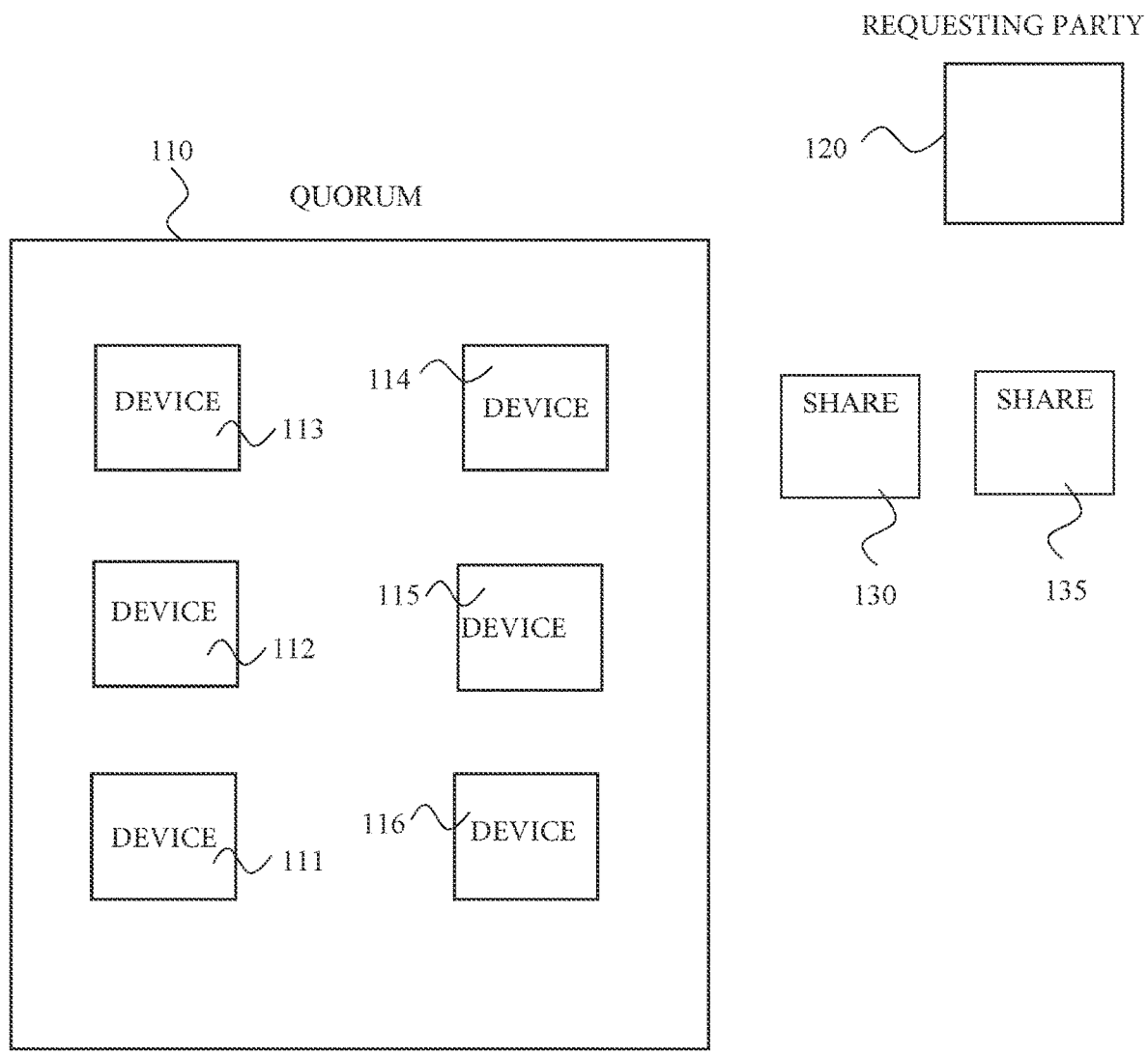
FIG. 1 discloses a computerized environment for preventing misuse of a cryptographic key, according to exemplary embodiments of the subject matter.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

Illustrative embodiments of the invention are described below. In the interest of clarity, not all features/components of an actual implementation are necessarily described.

The invention, in embodiments thereof, discloses a system and method for using a quorum having multiple computerized devices in order to prevent misuse of a cryptographic key. Use of the cryptographic key is requested by a party in order to carry out cryptographic operations for any client that is authenticated. The quorum of multiple computerized devices, also defined below as quorum, may output a decision on whether or not to approve use of the cryptographic key, thereby enabling or disabling the cryptographic operation.

The quorum may include machines and/or of humans, as humans approve via a machine, such as a mobile device or personal computer. The quorum may be defined according to a person skilled in the art, for example 3 votes out of 5 devices, 1 vote out of 2 and the like. The quorum may change for a specific cryptographic key. The quorum may change according to the party requesting access to the cryptographic key.

Human approvers are likely to be used for extremely critical operations that happen occasionally, such as like code signing on a final release or a large transfer of crypto-assets, and machine-only quorums can be used for high frequency operations. Importantly, quorum authorization is cryptographically enforced, and so there is no machine in the network that can be accessed to bypass it. Quorum authorization can also be used to define maker/checker workflows for business transactions that are cryptographically enforced.

The method for preventing misuse of a cryptographic key may utilize a policy engine. The policies may be used by the computerized devices in the quorum to decide whether or not to enable access to the cryptographic key. The policies may vary among different computerized devices, or vary according to the cryptographic operation desired to be performed based on a request received from a party requesting to access the cryptographic key. Some policies may be enforced by multiple entities. A policy is defined as a set of rules that governs if an operation is allowed to take place. The set of rules may be dynamic and updated over time. The update may be based on information collected by at least some of the multiple computerized devices of the quorum. The rules in the policies may consider basic elements like time of day, devices' location and rate limiting to advanced checks like Know your Customer (KYC) protocols, Anti Money Laundering (AML) for financial transactions, fraud detection, anomaly detection tools (queried before and not after the operation), and any other computerized technology, technique or tool. Utilizing quorum authorization, the policy can be cryptographically enforced at multiple points, ensuring that no single element can be bypassed. The result is a policy that can be defined centrally and enforced in a distributed manner.

FIG. 1 discloses a computerized environment for preventing misuse of a cryptographic key, according to exemplary embodiments of the subject matter. The computerized environment includes a requesting party 120 that requests to carry out a cryptographic operation using a cryptographic key. The request may be received over any communication network, protocol or technique desired by a person skilled in the art, such as over the internet, by inputting a request into a dedicated interface, into a software application and the like. The requesting party 120 may be a personal computer, laptop, cellular phone, server, tablet and the like. The requesting party 120 includes a communication unit configured to exchange information with another device.

The computerized interface also includes a quorum 110 having multiple computerized devices 111, 112, 113, 114, 115 and 116. The devices may be of the same type, or of various types. For example, a quorum of 5 devices may contain two cellular phones, a server and two laptops. The multiple computerized devices 111, 112, 113, 114, 115 and 116 receive the request to carry out a cryptographic operation using a cryptographic key and output a decision on whether or not to allow the cryptographic operation requested by the requesting party 120 to be carried out, using the appropriate cryptographic key. The decision may be independent by each device of the multiple computerized devices 111, 112, 113, 114, 115 and 116, or may be an output of a process in which the multiple computerized devices 111, 112, 113, 114, 115 and 116 exchange information.

The computerized environment also includes multiple computerized entities, such as two entities 130, 135 configured to assist in preventing misuse of a cryptographic key. The two entities 130, 135 may be part of the quorum 110, or may be excluded from the quorum 110. The entities 130, 135 include processors and a set of rules for verifying that signatures received from the multiple computerized devices are valid. The entities 130, 135 may be servers, or any other type of electronic devices. The entities 130, 135 exchange information with at least some of the computerized devices in the quorum 110, for example for verifying the validity of the information provided from the devices in the quorum 110.

The entities 130, 135 may include shares of a secret, such as a cryptographic key required to perform the cryptographic operation requested by the requesting party 120. The shares may be used to perform a multi-party computation (MPC) process between the entities 130, 135. The output of the MPC process is the cryptographic operation requested by the requesting party.

The parties or devices 111, 112, 113, 114, 115 and 116, 120, 130 and 135 may include communication modules configured to enable communication over a network, such as the internet, such as using an internet gateway, local access network, wide access network and the like. The communication modules may also operate over a non-internet communication channel, for example using wired communication, fiber optics, USB, or wireless communication such as Bluetooth and the like.

Each of the parties or devices 111, 112, 113, 114, 115 and 116, 120, 130 and 135 may also have a memory unit, or access to a memory unit located in a remote device working uniquely with a specific party of the parties or devices 111, 112, 113, 114, 115 and 116, 120, 130 and 135. The memory unit may be either volatile memory or non-volatile memory. The memory unit may store instructions for performing the process elaborated below. The memory unit may also store the shares of the secret known to each of the parties 130 and 135.

Each of the parties or devices 111, 112, 113, 114, 115 and 116, 120, 130 and 135 may also have a processing module configured to manage the part of the process performed in each party. The processing module may be a processor, a CPU, a microprocessor, either implemented in software, hardware or firmware.

Figure 2:
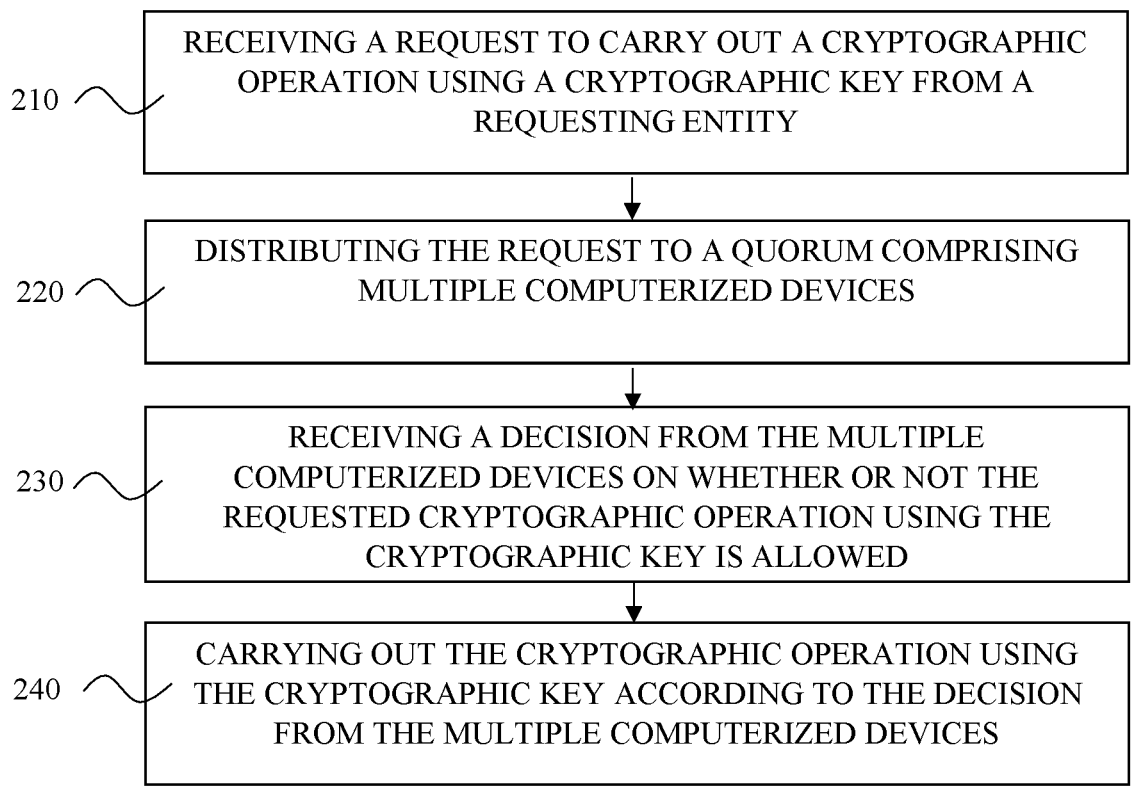
FIG. 2 discloses a method for preventing misuse of a cryptographic key, according to exemplary embodiments of the subject matter.

FIG. 2 discloses a method for preventing misuse of a cryptographic key, according to exemplary embodiments of the subject matter.

Step 210 discloses receiving a request to carry out a cryptographic operation using a cryptographic key from a requesting entity. The cryptographic operation may be, for example, encryption, decryption, signing messages, key derivation and the like. The request may include specification concerning the cryptographic operation. The specification may include a third party related to the cryptographic operation, such as a bank or another institution holding encrypted information that the requesting party wishes to access. The specification may further include information required to assess whether or not the requesting party is entitled to perform the cryptographic operation, such as signatures, documents, cryptographic operations performed by the requesting party, and the like.

Step 220 discloses distributing the request to a quorum including multiple computerized devices. The distribution includes sending the request to the multiple computerized devices. Sending may be performed over the internet. Sending may be performed by storing the request in a memory address accessible to the multiple computerized devices and sending a notification to the multiple computerized devices that the request is in a specific memory address.

Step 230 discloses receiving a decision from the multiple computerized devices on whether or not the requested cryptographic operation using the cryptographic key is allowed. The decision may be outputted from each of the multiple computerized devices separately. The computation resulting in the decision may be performed locally in each multiple computerized devices or on a server located in a remote device, or a combination of both. The decision may be outputted from a computation performed in cooperation by at least two of the multiple computerized devices. The cooperation may include a multi-party computation (MPC) process performed by the multiple computerized devices, in which the multiple computerized devices exchange information stored in each multiple computerized devices.

Step 240 discloses carrying out the cryptographic operation using the cryptographic key according to the decision from the multiple computerized devices. The cryptographic operation may be executed using an operating MPC process in case the cryptographic key is stored in shares, not in its entirety, among multiple entities, such that the shares are not revealed to other entities during the MPC process.

Figure 3:
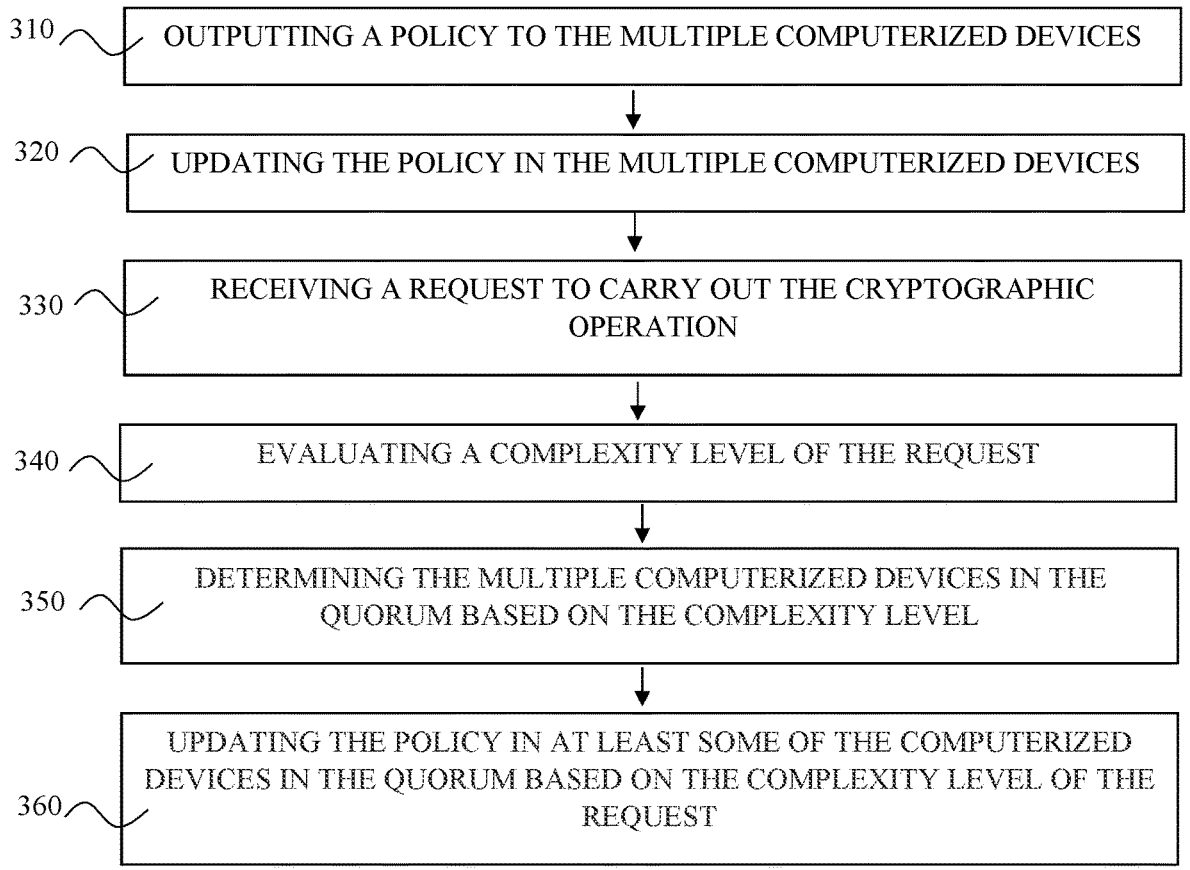
FIG. 3 discloses a method for outputting a decision on whether or not to allow access to a cryptographic key, according to exemplary embodiments of the subject matter; and, FIG. 4 discloses a method for using a multi-party computation when computing a decision on whether or not to allow access to a cryptographic key, according to exemplary embodiments of the subject matter.

FIG. 3 discloses a method for using a policy when computing a decision on whether or not to allow access to a cryptographic key, according to exemplary embodiments of the subject matter.

Step 310 discloses outputting a policy to the multiple computerized devices. The policy includes a set of rules used by the multiple computerized devices to decide whether or not to allow the cryptographic operation requested by the requesting party. The set of rules may be identical for all the multiple computerized devices, or may vary among the multiple computerized devices. The set of rules may vary based on device type, for example policy "A" for cellular phones and policy "B" for laptops. The policy may be outputted by sending a message over the internet.

Step 320 discloses updating the policy in the multiple computerized devices. Updating may be performed periodically, for example once a week after reviewing requests in the previous week, or in response to an event, such as failure to protect a key, or a burst of requests which exceeds normal behavior.

Step 330 discloses receiving a request to carry out the cryptographic operation. The request may be initiated by a requesting party, such as a server, or a person operating an electronic device. The request may include request specification, such as type of cryptographic operation, data to be accessed after performing the cryptographic operation, IP address of a server holding the data, IP address of a device holding the cryptographic key or key shares, and the like.

Step 340 discloses evaluating a complexity level of the request. The complexity level may depend on prior knowledge of the requesting party, location of the requesting party, organization from which the requesting party sent the request, type of cryptographic operation, amount and sensitivity of data to be accessed after carrying out the cryptographic operation and the like. The complexity level may be evaluated by a server, by a device which is part of the quorum, and the like.

Step 350 discloses determining the multiple computerized devices in the quorum based on the complexity level. For example, requests having a high complexity level may require more than 11 devices, while requests having a low complexity level may require only 5 devices.

Step 360 discloses updating the policy in at least some of the computerized devices in the quorum based on the complexity level of the request. The rules assembling the policy may be more strict in case the sensitivity of the data requested in the request is high, thereby limiting access to the specific data only to requesting parties having unique properties, such as unique certificates, signatures, origin, and the like.

Figure 4:
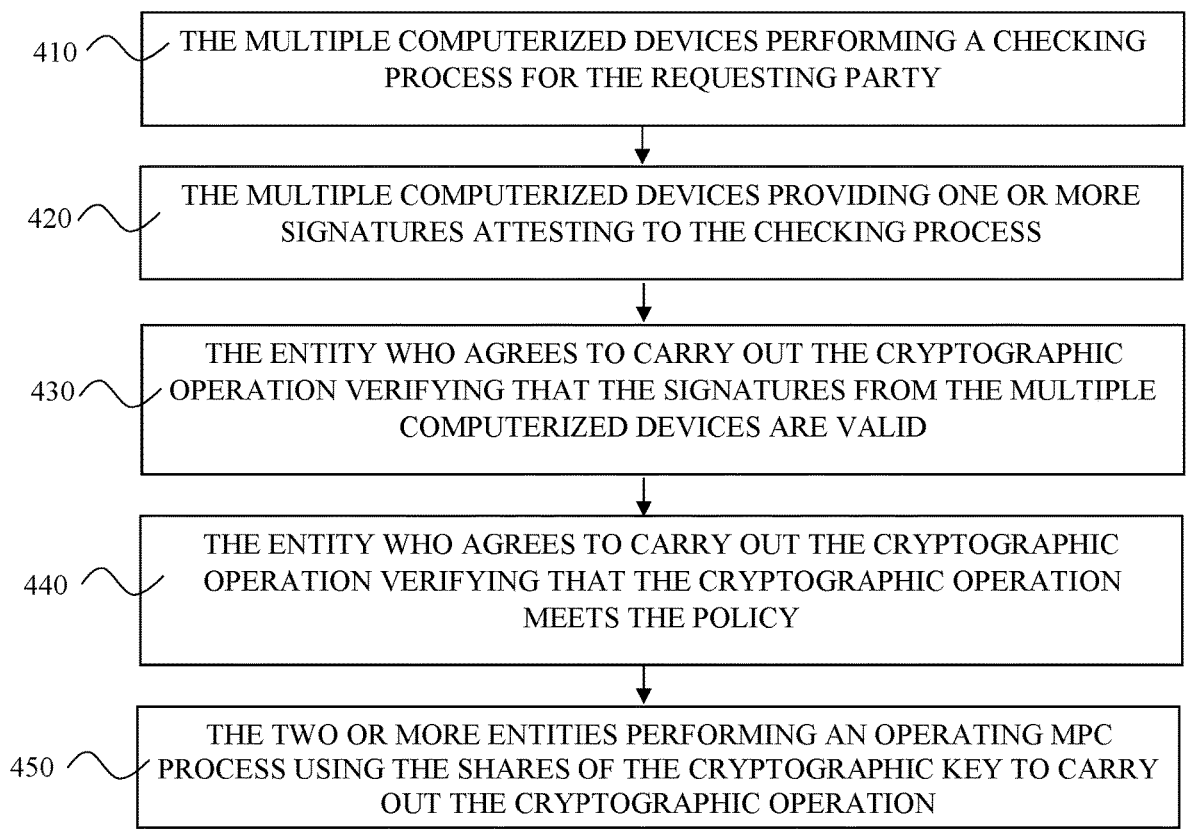

FIG. 4 discloses a method for using a multi-party computation when computing a decision on whether or not to allow access to a cryptographic key, according to exemplary embodiments of the subject matter.

Step 410 discloses the multiple computerized devices performing a checking process for the requesting party. The checking process includes verifying the request and other relevant information against the set of rules.

Step 420 discloses the multiple computerized devices providing one or more signatures attesting to the checking process. The signature may be generated as a result of a signature MPC process performed by the multiple computerized devices. During the signature MPC process, the multiple computerized devices exchange information with each other.

Step 430 discloses the entity who agrees to carry out the cryptographic operation verifying that the signatures from the multiple computerized devices are valid. If the entity receives an authorized quorum of valid signatures, or a signature generated with an MPC process requiring an authorized quorum, then the entity knows that the quorum has approved the operation.

Step 440 discloses the entity who agrees to carry out the cryptographic operation verifying that the cryptographic operation meets the policy. This step is carried out to ensure that all entities involved have verified that the policy is met.

Step 450 discloses the two or more entities performing an operating MPC process using the shares of the cryptographic key to carry out the cryptographic operation. During the operating MPC process, the two or more entities holding the shares exchange information with each other. The shares of the cryptographic key are not revealed to other entities during the MPC process.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiments disclosed.

What is claimed is:

1. A method for preventing misuse of a cryptographic key utilizing quorum authorization in a policy engine for fraud detection, wherein the policy engine comprises a set of rules that governs if fraud detection operations may occur, the method comprising:
   receiving a request, from a requesting entity, to carry out a cryptographic operation using a cryptographic key;
   distributing, by the policy engine, the request, over a communication network, to a quorum comprising multiple computerized devices, wherein the computerized devices in the quorum determine whether or not to allow the cryptographic operation using the cryptographic key based on a policy, wherein the policy is selected based on device types of the multiple computerized devices, and wherein the policy is updated by:
   evaluating a complexity level of the request; and
   updating the policy in at least some of the computerized devices in the quorum based on the complexity level of the request, wherein the complexity level of the request is based on a sensitivity of data to be accessed after carrying out the cryptographic operation;
   receiving a decision from the multiple computerized devices on whether or not the cryptographic operation using the cryptographic key is allowed; and
   carrying out the cryptographic operation using the cryptographic key according to the decision from the multiple computerized devices.

2. The method of claim 1, wherein at least one of the multiple computerized devices is controlled by a person.

3. The method of claim 1, further comprising evaluating a complexity level of the request and determining the multiple computerized devices in the quorum based on the complexity level.

4. The method of claim 1, further comprising updating a policy in at least one of the computerized devices in the quorum.

5. The method of claim 1, wherein the policy is identical in all the computerized devices in the quorum.

6. The method of claim 1, wherein the policy is different among at least two of the computerized devices in the quorum.

7. The method of claim 1, wherein the multiple computerized devices perform a multi-party computation (MPC) process, wherein the decision is an output of the MPC process.

8. The method of claim 1, further comprising:
   the multiple computerized devices performing a checking process for the requesting entity;
   the multiple computerized devices providing multiple signatures attesting to the checking process;
   an entity who agrees to carry out the cryptographic operation verifying that the cryptographic operation meets the policy; and
   the entity who agrees to carry out the cryptographic operation verifying that the signatures from the multiple computerized devices are valid.

9. The method of claim 1, further comprising:
   the multiple computerized devices performing a checking process for the requesting entity;
   the multiple computerized devices providing multiple signatures attesting to the checking process;
   two or more entities holding shares of the cryptographic key who agree to carry out the cryptographic operation verifying that the cryptographic operation meets the policy;
   the two or more entities verifying that the multiple signatures received from the multiple computerized devices are valid; and
   the two or more entities performing an operating multi-party computation (MPC) process using the shares of the cryptographic key to carry out the cryptographic operation.

10. The method of claim 1, further comprising:
    the multiple computerized devices performing a checking process for the requesting entity;
    the multiple computerized devices running a signature multi-party computation (MPC) process to generate a single signature attesting to the checking process;
    an entity who agrees to carry out the cryptographic operation verifying that the cryptographic operation meets the policy; and
    an entity who agrees to carry out the cryptographic operation verifying that single signature from the multiple computerized devices is valid.

11. The method of claim 1, further comprising:
    the multiple computerized devices performing a checking process for the requesting entity;
    the multiple computerized devices running a signature multi-party computation (MPC) process to generate a single signature attesting to the checking process;
    two or more entities holding shares of the cryptographic key who agree to carry out the cryptographic operation verifying that the cryptographic operation meets the policy;
    two or more entities holding shares of the cryptographic key who agree to carry out the cryptographic operation verifying that the signature from the multiple computerized devices is valid; and
    the two or more entities performing an operating MPC process using the key shares to carry out the cryptographic operation.

12. The method of claim 1, further comprising:
    the multiple computerized devices performing a checking process for the requesting entity;

the multiple computerized devices and two or more entities holding shares of the cryptographic key;

the multiple computerized devices and the two or more entities agree to carry out the cryptographic operation verifying that the cryptographic operation meets the policy; and the multiple computerized devices and the two or more entities running an operating multi-party computation (MPC) process to carry out the cryptographic operation on the shares.

13. A system for preventing misuse of a cryptographic key utilizing quorum authorization in a policy engine for fraud detection, wherein the policy engine comprises a set of rules that governs if fraud detection operations may occur, the system comprising:

one or more processors; and non-transitory computer readable medium comprising instructions that when executed by the one or more processors cause operations comprising:

receiving a request, from a requesting entity, to carry out a cryptographic operation using a cryptographic key;

distributing, by the policy engine, the request, over a communication network, to a quorum comprising multiple computerized devices, wherein the computerized devices in the quorum determine whether or not to allow the cryptographic operation using the cryptographic key based on a policy, wherein the policy is selected based on device types of the multiple computerized devices, and wherein the policy is updated by:

evaluating a complexity level of the request; and updating the policy in at least some of the computerized devices in the quorum based on the complexity level of the request, wherein the complexity level of the request is based on a sensitivity of data to be accessed after carrying out the cryptographic operation;

receiving a decision from the multiple computerized devices on whether or not the cryptographic operation using the cryptographic key is allowed; and carrying out the cryptographic operation using the cryptographic key according to the decision from the multiple computerized devices.

14. The system of claim 13, wherein the multiple computerized devices perform a multi-party computation (MPC) process, wherein the decision is an output of the MPC process.

15. The system of claim 13, wherein:

the multiple computerized devices perform a checking process for the requesting entity;

the multiple computerized devices provide multiple signatures attesting to the checking process;

an entity who agrees to carry out the cryptographic operation verify that the cryptographic operation meets the policy; and the entity who agrees to carry out the cryptographic operation verify that the signatures from the multiple computerized devices are valid.

16. The system of claim 13, wherein:

the multiple computerized devices perform a checking process for the requesting entity;

the multiple computerized devices provide multiple signatures attesting to the checking process;

two or more entities hold shares of the cryptographic key who agree to carry out the cryptographic operation verifying that the cryptographic operation meets the policy;

the two or more entities verify that the multiple signatures received from the multiple computerized devices are valid; and the two or more entities perform an operating multi-party computation (MPC) process using the shares of the cryptographic key to carry out the cryptographic operation.

17. The system of claim 13, wherein:

the multiple computerized devices perform a checking process for the requesting entity;

the multiple computerized devices run a signature multi-party computation (MPC) process to generate a single signature attesting to the checking process;

an entity who agrees to carry out the cryptographic operation verify that the cryptographic operation meets the policy; and an entity who agrees to carry out the cryptographic operation verify that single signature from the multiple computerized devices is valid.

18. The system of claim 13, wherein:

the multiple computerized devices performs a checking process for the requesting entity;

the multiple computerized devices run a signature multi-party computation (MPC) process to generate a single signature attesting to the checking process;

two or more entities hold shares of the cryptographic key who agree to carry out the cryptographic operation verifying that the cryptographic operation meets the policy;

two or more entities hold shares of the cryptographic key who agree to carry out the cryptographic operation verifying that the signature from the multiple computerized devices is valid; and the two or more entities perform an operating MPC process using the key shares to carry out the cryptographic operation.

* * * * *